May 18, 1943     O. W. SCHLUMS     2,319,367
APRON GUIDING DEVICE FOR LONG DRAFT MECHANISM
Filed April 13, 1942
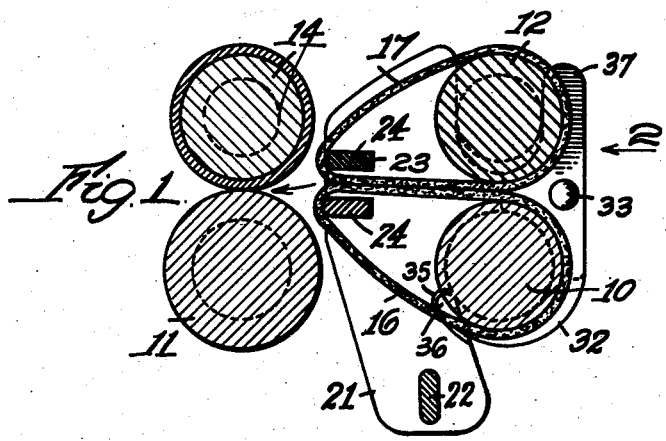
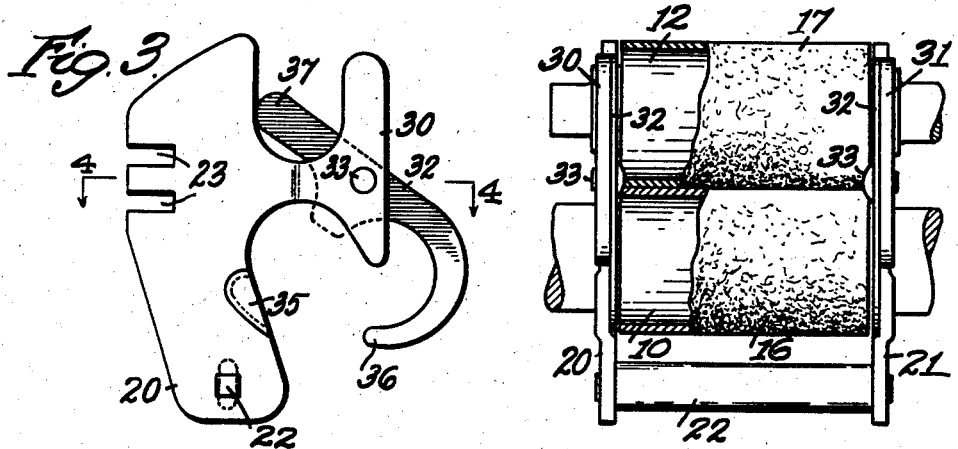
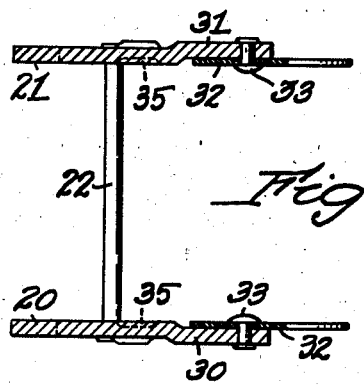
INVENTOR.
Otto W. Schlums Patented May 18, 1943

2,319,367

UNITED STATES PATENT OFFICE 2,319,367

APRON GUIDING DEVICE FOR LONG DRAFT MECHANISM

Otto W. Schlums, Whitinsville, Mass., assignor to Whitin Machine Works, Whitinsville, Mass., a corporation of Massachusetts Application April 13, 1942, Serial No. 438,740

2 Claims. (Cl. 19—131)

This invention relates to devices for guiding the aprons in long draft spinning mechanism, and of the general type shown and described in the prior patent to Truslow, No. 2,119,658.

In said patent, pivoted guards are provided to form additional guiding surfaces for the long draft aprons and to prevent side travel of said aprons. It is the general object of my present invention to improve the construction shown in said prior Truslow patent, to the end that certain novel and desirable results may be attained.

To the accomplishment of this general object, I have changed the locations of the pivotal connections between the guards and the cradle frame, and I have thereby facilitated the application of the long draft mechanism to the drawing rolls and the removal of said mechanism therefrom.

I have also offset and recessed certain parts of the cradle to receive the guards, to the end that more complete and more accurately aligned guiding surfaces may be provided, and with less chance of accumulation of lint or fly. This offset location of the guards also permits certain surfaces of the cradle to act as stops and to determine the inoperative positions of the guards.

My invention further relates to certain arrangements and combinations of parts which will be hereinafter described and more particularly pointed out in the appended claims.

A preferred form of the invention is shown in the drawing, in which

Fig. 1 is a sectional side elevation of certain parts of a long draft mechanism embodying my improvements;

Fig. 2 is a partial rear elevation, looking in the direction of the arrow 2 in Fig. 1;

Fig. 3 is a side elevation of a long draft cradle; and

Fig. 4 is a sectional plan view, taken along the line 4—4 in Fig. 3.

Referring to the drawing, I have shown portions of a long draft mechanism comprising driven lower draft rolls 10 and 11 and upper draft rolls 12 and 14 which are mounted for free rotation. Aprons 16 and 17 are mounted on the draft rolls 10 and 12 respectively and advance the fibre to the front rolls 11 and 14, as is customary in long draft apparatus.

My invention relates particularly to the cradles which guide and support the aprons 16 and 17. Each cradle comprises right and left side members 20 and 21, held in spaced relation by a cross bar 22. Notches 23 are provided in the front edges of the side members 20 and 21 to receive removable bars 24 around which the aprons 16 and 17 are guided. The parts thus far described are substantially as disclosed in the Truslow patent above identified.

Each side member 20 or 21 has a rearwardly extended portion 30 or 31, each of which is offset outward as clearly shown in Fig. 4. Guards 32 are pivoted at 33 to each offset rearward extension 30 or 31, and the amount of offset is substantially equal to the thickness of the guards 32, so that the inner faces of the guards and of the side members 20 and 21 are in alignment.

The side members 20 and 21 are also provided with recesses 35 in their inner faces to receive the curved forward ends 36 of the guards 32, so that these forward ends will overlap the recessed portions of the side members and will also be in alignment with the inner surfaces of said members.

Each guard 32 has an upwardly extending portion 37 by which the guard is locked in the operative position shown in Fig. 1 when the upper roll 12 is in running position. When a guard 32 is moved to inoperative position, as shown in Fig. 3, the upper end portion 37 thereof strikes a rear surface of the associated side member 20 or 21, which surface forms a stop or abutment to limit the swinging movement of the guard.

With the guard in the inoperative position thus predetermined and as shown in Fig. 3, the cradle may be more easily removed from the drawing rolls than with the prior Truslow construction in which the curved lower end portions of the guards extended rearward rather than forward.

With the construction herein shown, the long draft mechanism is not only more easily removed from the drawing rolls, but the edges of the aprons 16 and 17 are more completely guarded, as the curved ends 36 of the guards extend into the recesses 35, thus overlapping the side members. Furthermore, less clearance is required between the edges of the aprons and the inner side surfaces of the guards 32 and of the side members 20 and 21, as these inner surfaces are all in accurate alignment. This overlapping of the guards with the side members, in combination with the reduced clearance, much more effectively prevents the entrance of lint and fly at the edges of the aprons.

Having thus described my invention and the advantages thereof, I do not wish to be limited to the details herein disclosed, otherwise than as set forth in the claims, but what I claim is:

1. In a long draft mechanism having upper and lower front and back draft rolls and upper and lower aprons, in combination, a cradle for said aprons detachably mounted on said back rolls and having side members with rearward extensions, and guards for said aprons pivoted to said rearward extensions and behind said back rolls and swingable forwardly about said pivots to embrace the lower back draft roll and to prevent displacement of said cradle, said rearward extensions being offset outwardly with respect to the associated side members, thereby aligning the inside surfaces of said guards and of said side members, and recesses being provided in the side members to receive the curved outer ends of said guards when in operative position.

2. In a long draft mechanism having upper and lower front and back draft rolls and upper and lower aprons, in combination, a cradle for said aprons detachably mounted on said back rolls and having side members with rearward extensions, and guards for said aprons pivoted to said rearward extensions and behind said back rolls and swingable forwardly about said pivots to embrace the lower back draft roll and to prevent displacement of said cradle, said rearward extensions being offset outwardly with respect to the associated side members, thereby aligning the inside surfaces of said guards and of said side members, and said guards having upper locking extensions engaged by the upper back draft roll when in operative position, and said upper extensions engaging non-offset portions of said side members as stops when said guards are in inoperative position.

OTTO W. SCHLUMS.